United States Patent [19]

Lipsey

[11] Patent Number: 5,230,159
[45] Date of Patent: Jul. 27, 1993

[54] TAPE RULE CALCULATOR

[76] Inventor: William S. Lipsey, 414 N. Mill Street, Aspen, Colo. 81612

[21] Appl. No.: 928,504

[22] Filed: Aug. 11, 1992

[51] Int. Cl.$^5$ .............................................. G01B 3/02
[52] U.S. Cl. ..................................... 33/760; 33/768; 33/770
[58] Field of Search ................. 33/760, 762, 763, 768, 33/770

[56] References Cited

U.S. PATENT DOCUMENTS

| | | | |
|---|---|---|---|
| 4,181,959 | 1/1980 | Tateishi | 33/760 |
| 4,181,960 | 1/1980 | Tateishi et al. | 33/760 |
| 4,185,390 | 1/1980 | Tateishi | 33/762 |
| 4,316,081 | 2/1982 | Washizuka et al. | 33/762 |
| 4,488,250 | 12/1984 | Lipsey et al. | 364/709 |
| 4,662,078 | 5/1987 | Gammon et al. | 33/768 |
| 4,964,225 | 10/1990 | Waldherr | 33/768 |
| 5,025,966 | 6/1991 | Potter | 224/183 |

FOREIGN PATENT DOCUMENTS

| | | | |
|---|---|---|---|
| 2614982 | 11/1988 | France | 33/763 |
| 0056858 | 5/1979 | Japan | 33/763 |
| 0235009 | 11/1985 | Japan | 33/763 |
| 2217459 | 10/1989 | United Kingdom | 33/763 |
| 2229271 | 9/1990 | United Kingdom | 33/760 |

OTHER PUBLICATIONS

Sonin Calcu-Tape Pro Measuring Tool, Home Mechanix, p. 28, Nov. 1991.

*Primary Examiner*—Thomas B. Will
*Attorney, Agent, or Firm*—Duft, Graziano & Forest

[57] ABSTRACT

A calculator is adapted to be releasably attached to a conventional tape rule. A calculator case is attached to the rule with a flat rubber band that sits in a recessed channel in the case and passes around the tape rule. Alternatively the case may be attached to the tape rule with the screw that usually attaches a belt clip to the rule. The calculator is snapped into a protective pocket in the case. The calculator may be oriented face down so that the back of the calculator protects the keypad and display, or face up to expose the keys and display for use. The calculator may also be oriented in either of two positions differing by 180 degrees about an axis perpendicular to the case. Or the calculator may be removed from the case for independent use. Using the tape rule/calculator combination, a user may measure a distance and enter it into the calculator without releasing the tape rule.

18 Claims, 7 Drawing Sheets

TAPE RULE CALCULATOR

BACKGROUND OF THE INVENTION

1. Field of the Invention

The invention in general relates to length measuring tools and more particularly to a tape rule/calculator system.

2. Statement of the Problem

Tape rules, sometimes referred to as "tape measures", are tools that are used by carpenters, mechanics, construction workers, architects, designers, real estate estimators and salespersons, and many other professionals, as well as do-it-yourselfers and almost everyone that uses tools regularly. When a tape rule is used, there is often a need to record the measurement made and calculate a desired result. Thus it is common to use a tape rule and calculator sequentially. A problem that often arises is that the person using the tape rule is in the midst of taking measurements before he or she realizes the need for the calculator, and then must interrupt the taking of measurements to get a calculator. Or, preoccupied with the taking of measurements, recording and calculating, the user may leave one tool in one location while moving to another location with the other tool. Systems are known that make it relatively easy to connect a tape measure to a belt or otherwise attach it to a persons clothing. For example, many tape rules, such as the Stanley Powerlock TM have a clip for attaching the tape rule to a belt or pocket. See also U.S. Pat. No. 5,025,966 issued to Stephen B. Potter. However, up to now there has been no known system for combining a tape rule and calculator. Thus there is a need for a system for including a tape rule and calculator in one package.

Even when the tape rule user has a calculator in hand, the separate units can create handling problems. While many tape rules have locks that lock the tape in place, these locks do not generally mark the place on the tape to which the measurement has been made. When making many consecutive measurements that include feet, inches, and fractions of an inch, it is easy to forget one or more portions of the measurement. It is difficult if not impossible to hold a rule in place so that a reading is not lost, and at the same time key the reading into a calculator. Thus, professionals that desire measurements to be made and recorded accurately, generally take a good deal of time carefully taking the measurement, releasing the tape, entering the measurement into a calculator or otherwise recording the figure, and then calculating the desired result. Thus a tape rule/calculator system that allows one to hold the tape with one hand while entering information into the calculator with the other would save considerable time and increase the accuracy of the measuring, recording, and calculating processes. A calculator that permits the user to record a list of measurements as well as perform calculations would be particularly useful in combination with a tape rule, since often there is a need to record measurements whether or not a calculation is to be performed.

A tape rule can often become a personal tool; that is, individuals may have strong personal preferences for a particular brand or type of tape rule. Tape rules can differ in many ways: for example, tape rules may have the numbers facing either to the left or right when the rule is extended, or aligned so they can be read vertically. Further, there are already many millions of tape rules in use. Thus it would be useful to have a tape rule/calculator system that permits a calculator to be used with the wide variety of tape rules available in the market-place and to be combined with a wide variety of conventional tape rules that are already in use. In addition, tape rules and calculators generally have different lifetimes. Thus a tape rule/calculator system that permits the tape rule and calculator to be independently replaced would be highly desirable.

The manner of using a tape rule can also be personal; that is, each individual that frequently uses a tape rule will develop habits of use that generally will be different than the habits of use of other persons. Thus there is a need for a tape rule/calculator system that is flexible enough to suit the personal habits of use of a wide variety of users.

Tape rules and calculators are often used in industrial and other work situations that can be tough on tools. Since calculators are generally not as rugged as tape rules, there is a need for a tape rule/calculator system provides protection for the calculator both while in use and while not in use.

In English speaking countries, the units of measure that are used with tape rules is generally the British foot-inch-fraction system. Calculators that use the foot-inch-fraction system are known; see for example, U.S. Pat. No. 4,488,250 issued to William S. Lipsey and Henry B. Teague. However, these calculators are all stand alone calculators. Thus it would be highly desirable to have a tape-rule/calculator system which calculates in feet, inches, and fractions.

3. Solution to the Problem

The present invention solves the above problems by providing a system for attaching a calculator to a conventional tape rule.

The invention provides a calculator case that attaches to a tape rule and a calculator that attaches to the case.

The calculator case is preferably attached to the tape rule with an elastic band. The band is made of a material, such as EPDM, that is resistant to ultraviolet light, pollutants, and abrasion, and is formed in a single-piece and is of a shape which allows it to be easily applied to any side of the tape rule and maintain a constant width to fit in a recessed channel in the case. It has an oblong cut out portion which permits the band to fit around the conventional belt clip that is attached to many tape rules. The case also includes a screw slot which allows it to be screwed to the tape rule in place of the belt clip, using the same screw that normally holds the belt clip. The screw can be used in combination with the elastic band to provide additional stability, or be used alone.

The case includes a recessed socket to receive the calculator. The calculator preferably snaps into the case pocket in one of four positions: it may be snapped into the pocket with the calculator pad facing either inward for protection or outward for use, and in each case it may take one of two orientations that differ by 180 degrees. Together with the fact that the case can be attached to any side of the tape rule, this provides at least 20 different positions in which the calculator can be mounted on a conventional tape rule to suit the preferences of the user. The case is preferably made of polyethylene which provides flexibility to allow the calculator to be easily snapped into and removed from the case. The calculator housing is made of high strength plastic, such as ABS or polycarbonate. The calculator has raised posts on the back to provide clearance from the case and thereby prevent it from sticking to the case.

The surface of calculator case that contacts the tape rule conforms to the generally convex surface of the conventional tape rule case, which permits the case to seat securely on the tape rule without wobble. The external shape and dimensions of the case also conform to the shape and dimensions of conventional tape rule cases, which makes the tape rule/calculator a single, compact, easy to handle unit, and also results in the tape rule providing protection to the calculator.

The case includes raised areas that extend beyond the calculator pocket to protect the calculator against impacts. The keypad is one-piece and rubber-sealed to keep out dust and moisture. The calculator has a lens to protect the LCD display. The calculator includes a power source that generates power from light so that it never needs batteries and thus does not have to be opened in environments that may be hostile to calculators. The calculator also may be separated from the case and used separately if needs or circumstances so warrant.

The tape rule/calculator system of the invention permits the direct input of feet, inches and fractions of inches and displays the results of calculations in these same units. Areas and volumes are calculated automatically.

The user of the tape rule/calculator system of the invention may measure a dimension while holding the tape with one hand, then, without releasing the tape rule, enter the measurement into the calculator with the other hand. The user may then perform a calculation if desired, and thereafter immediately adjust or alter the position of the tape rule and take another measurement if the circumstances warrant it. After a user acquires experience with the system according to the invention, the system effectively becomes a new tool that is much more powerful and flexible than the separate tape rules and calculators of the prior art.

SUMMARY OF THE INVENTION

The invention provides a tape rule/calculator system comprising: a tape rule; a calculator; and attaching means for attaching the calculator to the tape rule. Preferably, the tape rule includes a tape rule housing, the calculator incudes a calculator housing, and the attaching means comprises means for attaching the calculator housing to the tape rule housing. Preferably, the attaching means comprises means for releasably attaching the calculator housing to the tape rule housing. Preferably, the attaching means comprises; a calculator case; calculator attaching means for attaching the calculator housing to the calculator case; and case attaching means for attaching the case to the tape rule housing. Preferably, the calculator attaching means comprises snap tabs. Preferably, the tape rule housing has a threaded bore, the case includes a case base member for contacting the tape rule housing, the base member having an opening therein, and the case attaching means comprises a screw passing through the base member opening and screwing into the threaded bore in the tape rule housing. Preferably, the case attaching means comprises a resilient band. Preferably, the case includes a case base member for contacting the tape rule housing, and the base member has a recessed channel for receiving the resilient band. Preferably, the resilient band includes a cut out portion and is made of EPDM. Preferably, the calculator attaching means comprises means for attaching the calculator to the case in one of a plurality of possible orientations. Preferably, the calculator includes a display attached to one side of the calculator housing, and the calculator attaching means comprises means for attaching the calculator to the tape rule housing either with the display toward the tape rule housing so that the display is protected or with the keyboard away from the tape rule housing thereby exposing the keyboard for use. Preferably, the case attaching means comprises means for attaching the case to the tape rule in one of a plurality of possible orientations. Preferably, the tape rule housing has at least two sides; and the case attaching means comprises means for attaching the case aligned along any one of a plurality of the sides. Preferably, the attaching means comprises means for attaching the calculator housing to the tape rule housing in any one of a plurality of possible orientations. Preferably, the tape rule housing has at least two sides; and the attaching means comprises means for attaching the calculator aligned along any one of a plurality of the sides. Preferably, the attaching means comprises means for attaching the calculator to tape rule housing either with the display toward tape rule housing so that the display is protected or with the display away from the tape rule housing thereby exposing the display for use.

The invention also provides a method of recording tape rule measurement data comprising: providing a tape rule and a calculator in a single unit; holding the tape rule and calculator unit in at least one hand; and without releasing the tape rule calculator unit: extending the tape in the tape rule; reading measurement information from the tape rule; and entering the measurement information into the calculator. Preferably, the tape rule calculator unit is continuously held in one hand that is different from the hand that enters the measurement information. Alternatively, the hand holding the tape rule calculator unit is switched during the method without letting go of the tape rule and calculator unit. Preferably, the step of providing comprises providing a calculator having a keypad, and further including the step of tilting the calculator so that the keypad is more visible and can be reached easier with the fingers of the hand that enters the measurement information prior to entering the measurement information.

The invention not only provides a tape rule/calculator system that performs all the functions of the prior art separate tape rules and calculators, but it also addresses many potential problems of the combined system, including securing the two instruments so they can be handled as a single unit, providing flexibility so that the user can adapt the system to his or her own habits, and providing protection to the calculator so the tape rule can be used without special constraints. As a result, in the hands of the experienced user, the tape rule/calculator becomes a new tool with new uses that the prior art did not permit. Numerous other features, objects and advantages of the invention will become apparent from the following description when read in conjunction with the accompanying drawings.

DESCRIPTION OF THE PREFERRED EMBODIMENT

1. Overview

Figure 1:
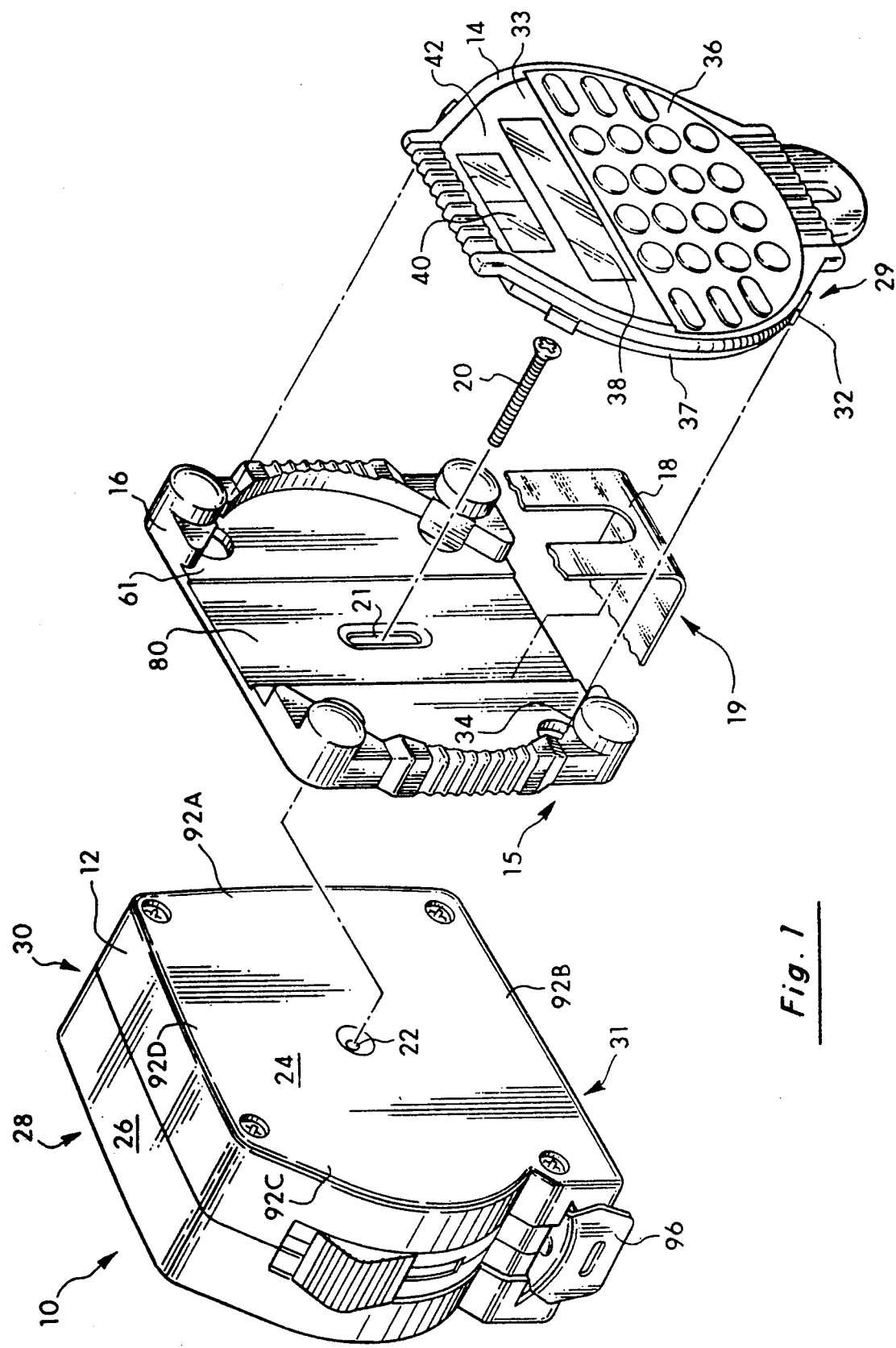
FIG. 1 is a partially exploded perspective view of the preferred embodiment of a tape rule/calculator according to the invention in which the calculator is aligned along the side of the tape rule that conventionally has a belt clip attached.
Figure 5:
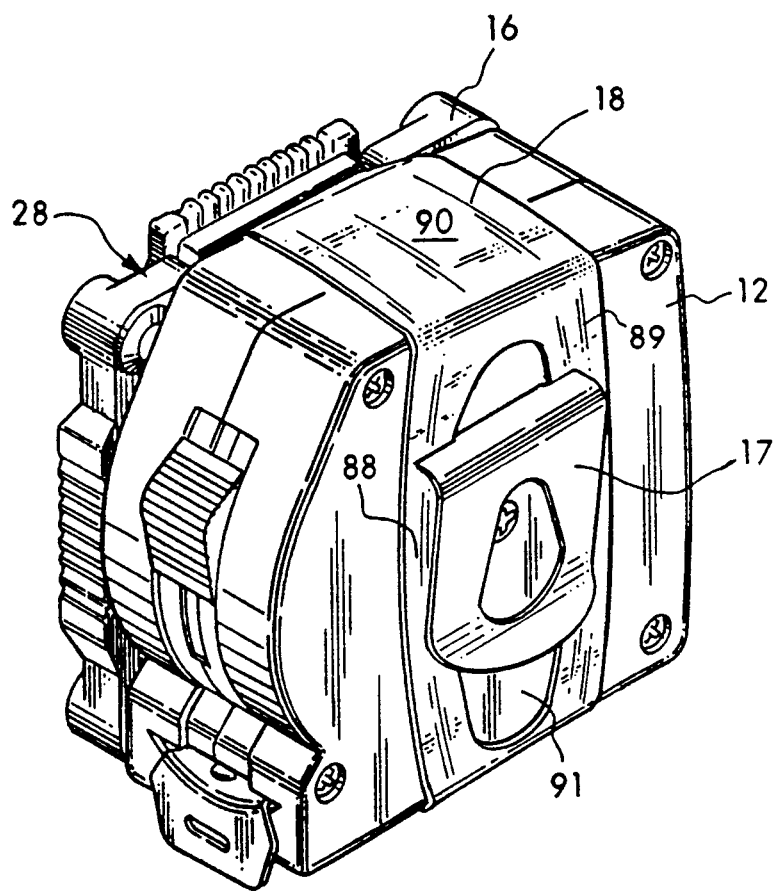
FIG. 5 is a perspective view of a tape rule/calculator according to the invention with the calculator aligned along the side of the tape rule opposite the belt clip.

Turning now to FIG. 1, there is shown a partially exploded view of the preferred embodiment of a tape rule/calculator system 10 according to the invention. It should be understood that the particular embodiment of the invention described herein is exemplary, and is described in detail to more clearly and fully depict the invention than would otherwise be possible; it is not meant to limit the invention to this particular embodiment. The preferred embodiment of the tape rule/calculator system 10 according to the invention includes a tape rule 12 and a calculator 14. A means 15 for attaching the calculator 14 to the tape rule 12 comprises a calculator case 16, a means 19 for attaching the calculator case 16 to the tape rule 12, and a means 29 for attaching the calculator 14 to the calculator case 16. The means 19 for attaching the calculator case 16 to the tape rule 12 includes a resilient band 18, the screw 20 which normally would attach a belt clip 17 to the tape rule 12 as shown in FIG. 5, an opening 21 through the case 16 through which the screw 20 passes, and the screw bore 22 in the tape rule 12. The means 29 for attaching the calculator 14 to the case 16 includes four lips, such as 34, on case 16, and four snap tabs, such as 32 on calculator housing 37. The calculator includes a keypad 36, a display 38, and a power source 40. The display 38 and power source 40 are protected by a lens 42 that covers the calculator face 33 in the area above the keypad 36.

Calculator case 16 may be attached to tape rule 12 in any one of five different orientations. The case 16 may be attached to tape rule 12 so that the calculator 14 is aligned along side 24 of tape rule 12 as shown in FIG. 1. In this position, preferably both the resilient band 18 and the screw 20 are used to attach the calculator case 16 to the tape rule 12. The screw 20 provides additional stability to the attachment. Only a portion of the resilient band is shown in FIG. 1 so as not to hide other elements of the system 10; the manner in which the band is applied to hold the case 16 to tape rule 12 is shown more clearly in FIG. 5. The case 16 may also be attached to tape rule 12 using the resilient band 18 alone so that calculator 14 is aligned along side 28 of tape rule 12 as shown in FIG. 5. Or the case 16 may be attached to rule 12 with band 18 so that the calculator is aligned along any one of sides 26, 30, or 31 of tape rule 12. Calculator 14 may in turn be attached to case 16 in any one of four different orientations. The calculator 14 may be attached with the face 33 having display 38, power source 40, and keypad 36 facing away from the tape rule 12 thereby exposing display 38, power source 40, and keypad 36 for use as shown in FIG. 1. Or calculator 14 may be attached to case 16 rotated 180 degrees about a vertical axis in FIG. 1 so that the face 33 faces tape rule 12 so that the back 45 (FIG. 2B) of calculator housing 37 protects the display 38, power source 40, and keypad 36. The calculator 14 may also be rotated 180 degrees about an axis perpendicular to the face 33 of calculator 14 so that the power source would be at the bottom in FIG. 1. The same rotation may be made with the face 33 facing toward the tape rule 12. Thus there are at least twenty possible orientations of the calculator 14 with respect to tape rule 12.

2. Details of the Tape Rule/Calculator System

Figure 2A:
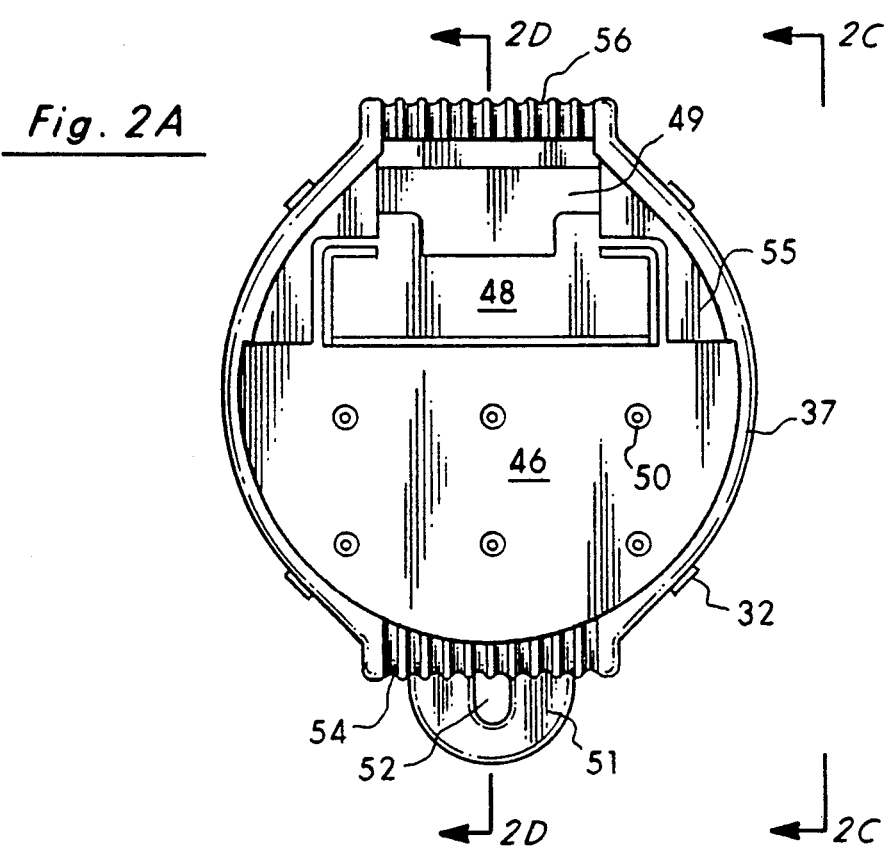
FIG. 2A is a front plan view of the calculator housing of the embodiment of FIG. 1.

Turning now to FIG. 2A, a front plan view of the calculator housing 37 is shown. The housing 37 has recesses 46 into which an electronics module (not expressly shown) and keypad 36 fit, and recesses 48 and 49 into which display 48 and power source 49, respectively, fit. Six locator pins 50 locate the electronics module accurately. The calculator housing 37 also includes four tabs 32 for attaching the calculator 14 to the calculator case 16, a rounded extension 51 having a slot 52 to which a cord (not shown) may be tied, and ribbed areas 54 and 56 which provide both protection and a gripping surface.

Figure 2B:
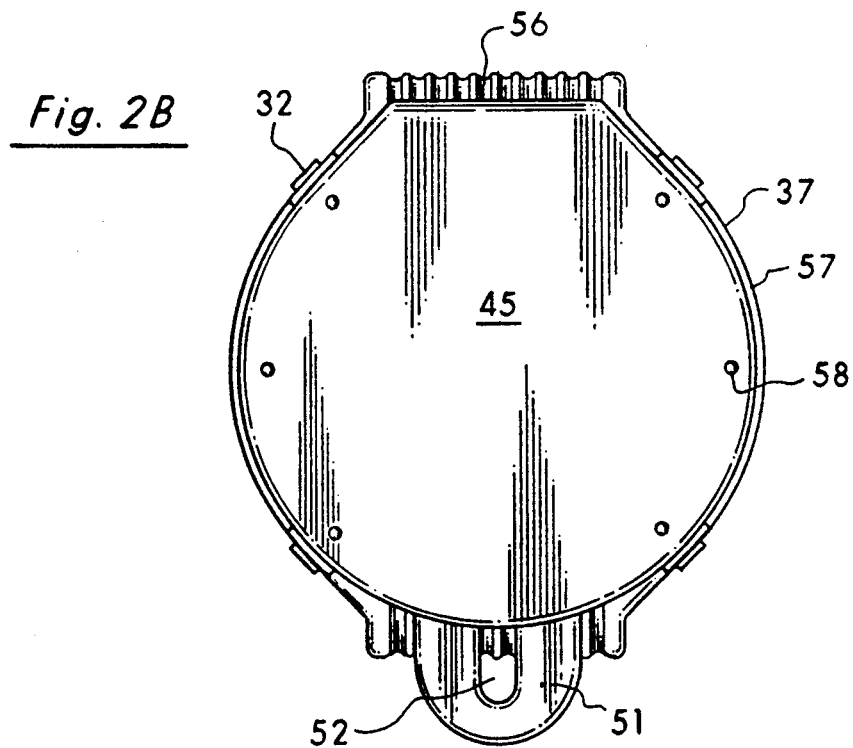
FIG. 2B is a back plan view of the calculator housing of FIG. 2A.
Figure 2C:
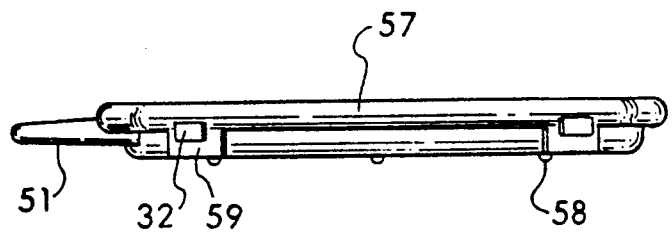
FIG. 2C is a side view of the calculator housing of FIG. 2A in the direction shown by the line 2C—2C in FIG. 2A.
Figure 2D:
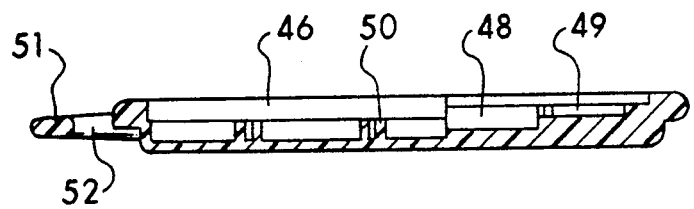
FIG. 2D is a cross-sectional view of the calculator housing of FIG. 2A taken through line 2D—2D in FIG. 2A.

FIG. 2B shows a back view of the calculator housing 37. the back surface 45 has 6 bosses 58 protruding from it. These bosses 58 provide a small air gap between the back 45 of the calculator and the front surface 60 (FIG. 3A) of calculator case 16 to prevent a seal from forming, which seal could cause the two surfaces to stick together. As best seen in FIGS. 2B and 2C, the top periphery or calculator 14 has a thickening rib 57 and there is also a thickened area 59 about each tab 32 which strengthen these critical areas.

Figure 2E:
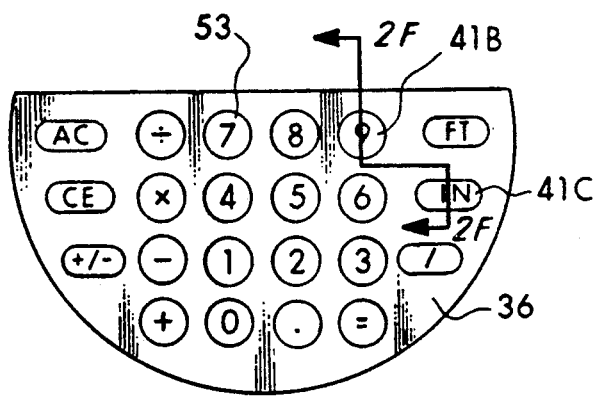
FIG. 2E is a front plan view of the keypad of the embodiment of FIG. 1.
Figure 2F:
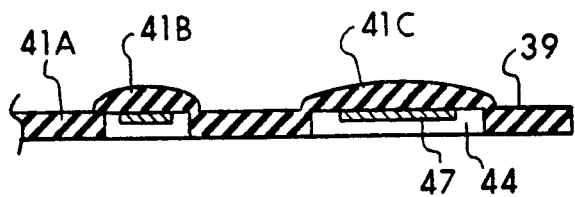
FIG. 2F is a cross-sectional view of a portion of the keypad of FIG. 2E taken through the line 2F—2F in FIG. 2E.

The keypad 36 is shown in FIGS. 2E and 2F. It includes a one-piece rubber member 39 which includes a base portion 41A and raised keys 41B and 41C over holes 44 in the base portion 41. Carbon contacts 47 are located behind each key 41B, 41C so that depressing a key, such as 41C, will cause the carbon 47 to contact traces (not shown) on the electronics module (not shown). Each key has an indicia, such as 53, printed on it. The number and mathematical operator keys, such as 41B, are circular while the other function keys, such as 41C, are oblong. Lens 42, best seen in FIG. 1, is a clear plate shaped to fit in the area 55 (FIG. 2A) above keypad 36. It is preferably painted black except in the areas above display 38 and power source 40 which are left clear.

Figure 3A:
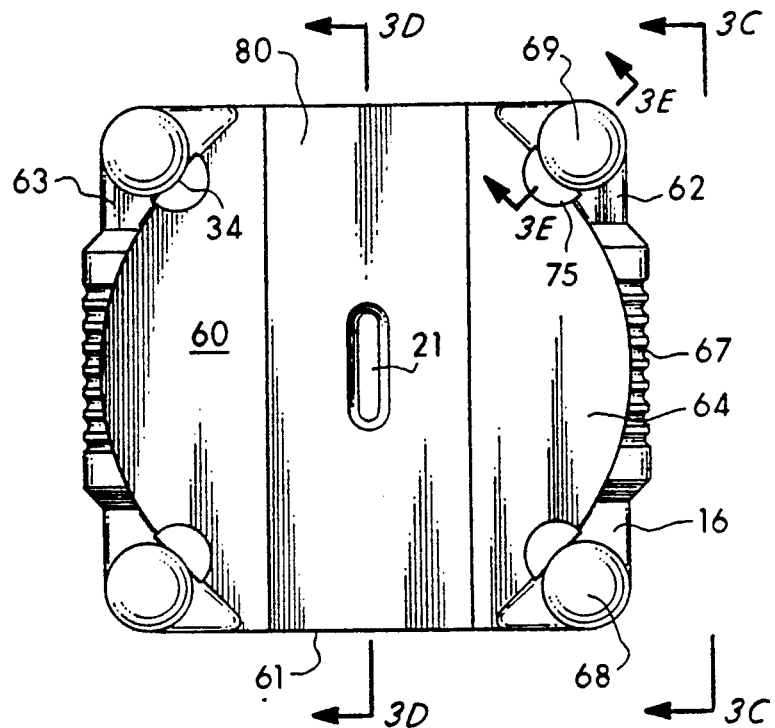
FIG. 3A is a front plan view of the calculator case of the embodiment of FIG. 1.
Figure 3B:
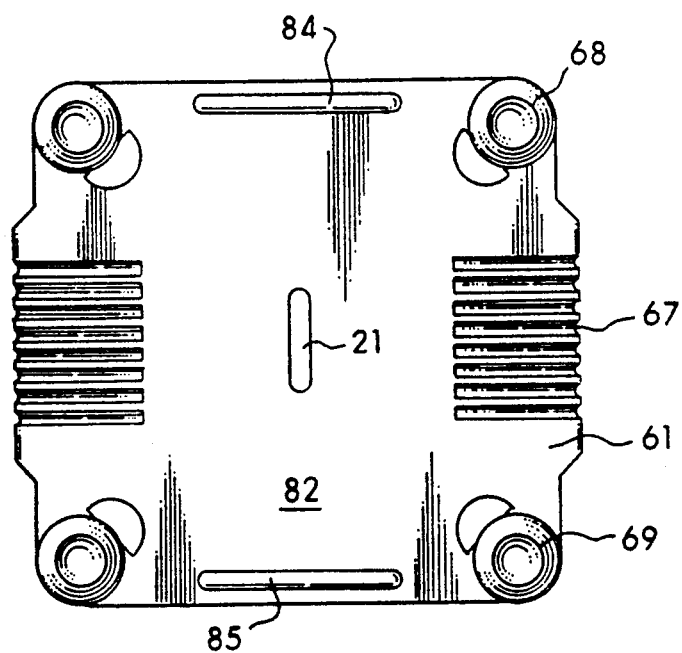
FIG. 3B is a back plan view of the calculator case of FIG. 3A.
Figure 3C:
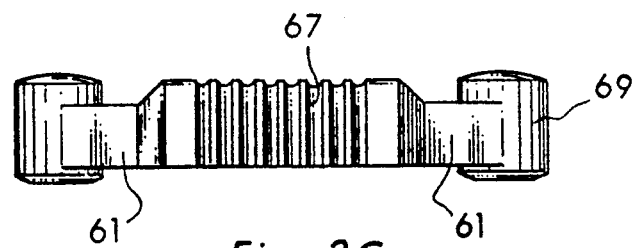
FIG. 3C is a side view of the calculator case of FIG. 3A in the direction 3C—3C shown in FIG. 3A.
Figure 3D:
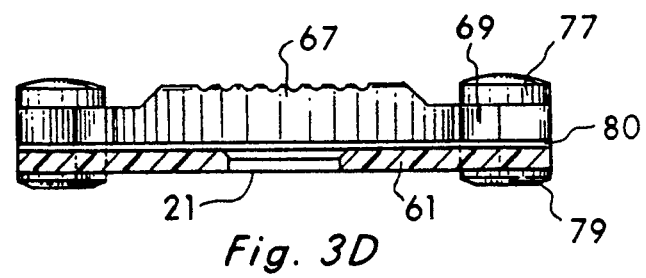
FIG. 3D is a cross-sectional view taken through line 3D—3D in FIG. 3A.
Figure 3E:
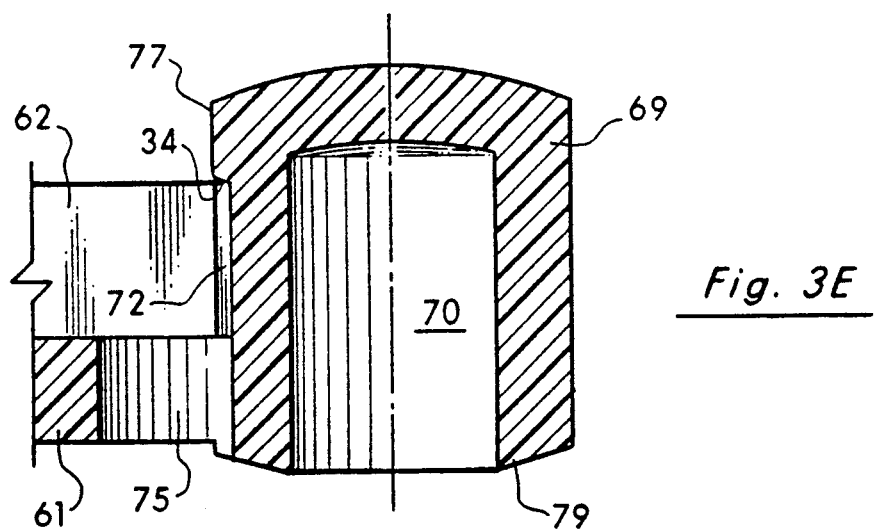
FIG. 3E is a cross-sectional view of a portion of the calculator case of FIG. 3A taken through the line 3E—3E in FIG. 3A.

FIGS. 3A through 3E show the calculator case 16: FIG. 3A shows a front plan view, FIG. 3B shows a back view, FIG. 3C shows a side view, FIG. 3D shows a cross-section through lines 3D—3D of FIG. 3A, and FIG. 3E shows a cross-section through line 3E—3E of FIG. 3A. Case 16 comprises a roughly rectangular base member 61 and two raised rims 62 and 63 forming a socket 64 for receiving the calculator housing 37. Each rim, such as 62, includes a raised ribbed area 67 which projects slightly above the calculator housing 37 when the calculator 14 is in case 16 to provide both protection and a gripping surface, and a pair of hollow posts 68 and 69. FIG. 3E shows a cross-section of post 69. Each post, such as 69, includes a hollowed out portion 70, and in indented portion 72. Indented portion 72 forms a lip 34 under which the tabs 32 of calculator housing 37 snap to hold the calculator 14 to the case 16. Each post, such as 69, also includes a rounded portion 77 which extends above projecting member 62 and a rounded portion 79 which extends below the bottom surface 82 of base member 61. The portion 77 projects above the calculator housing 37 when the calculator 14 is snapped in to case 16, thereby providing additional protection for the calculator at each corner. The opening 75 is provided for manufacturability reasons. A recessed channel 80 is formed in the base member 61 to receive the resilient band 18. The ribbed area 67 is continued to the back surface 82 of the case (FIG. 3B). The back of the case also has a pair of ribs 84 and 85 along the rectangular edges between the ribbed areas 67, the purpose of which we shall describe below.

Figure 4:
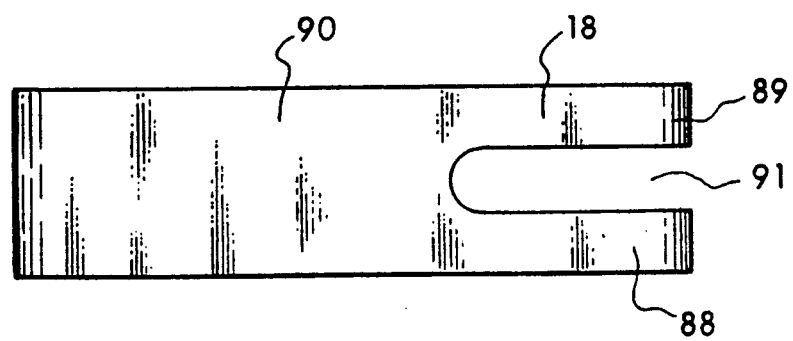
FIG. 4 is a plan view of the resilient band of the embodiment of FIG. 1.

The resilient band 18 is shown in FIGS. 4 and 5. It includes a broad portion 90, and an oblong cut out area 91 which is "hot dog" shaped. The band 18 is preferably a thin, flat, single piece of flexible material with a high coefficient of friction on smooth plastic. Broad portion 90 assists the band in lying flat. The thickness of band 19 is such that it lies flush in recess 80 in case base 61, and the width is such that it snugly fits into recess 80. The cut out portion 91 between prongs 88 and 89 is about 0.25 inches wide by 1.25 inches long and allows the band to fit around the belt clip as shown in FIG. 5.

The tape rule calculator 10 may be assembled in at least 20 ways, two of which are shown in FIGS. 1 and 5. The electronics module (not shown) keypad 36, display 38, power source 40, and lens 42 are mounted in their appropriate recesses 46, 48, and 49 by conventional means, such as waterproof glue. If the calculator 14 is to be mounted on the side 24 (FIG. 1) to which the belt clip 17 (FIG. 5) is attached, the belt clip 17 is removed with a screw driver by unscrewing screw 20 from bore 22. The screw 20 is inserted through hole 21 in base member 61 and rescrewed into bore 22 after aligning the sides of case 16 with the sides of rule 12. Resilient band 18 is inserted in recessed channel 80 in case base member 61 and stretched around the tape rule 12. Calculator 14 is then snapped into case 16 with tabs 32 snapping under lips 34. If the calculator 14 is to be mounted on any other of the sides 26, 28, 30, and 31 other than the side 24, then the step of unfastening the clip 17 and refastening the case 16 with screw 20 is omitted.

In the conventional tape rule, such as the Stanley Powerlock TM, the edges of the tape rule, such as 92A, 92B, 92C, and 92D, are tapered inward, so that each side 24, 26, 28, 30, and 31 has a slightly convex shape. The raised areas 77, 79, 84, 85, cause the case 16 to conform to the curving side of the tape rule 12 thereby making the calculator case 16 very stable, particularly when mounted on the sides 24 and 28, so that calculator 14 and tape 12 become a single unit. Generally, the narrow sides 26, 30 and 31 of the conventional tape rule 12 are roughened to increase the gripabilty of the tape rule 12, which also increases the stability of case 16 On the tape rule 12 when mounted on these sides. The flat shape of resilient band 18 and the high friction of the material of which it is made also greatly increase the stability when mounted on any side. The split or "hot dog" shaped hole 91 in the resilient band allows it to go around the clip 17 which preserves the function of the clip and increases stability when the calculator is mounted on side 28.

Figure 6:
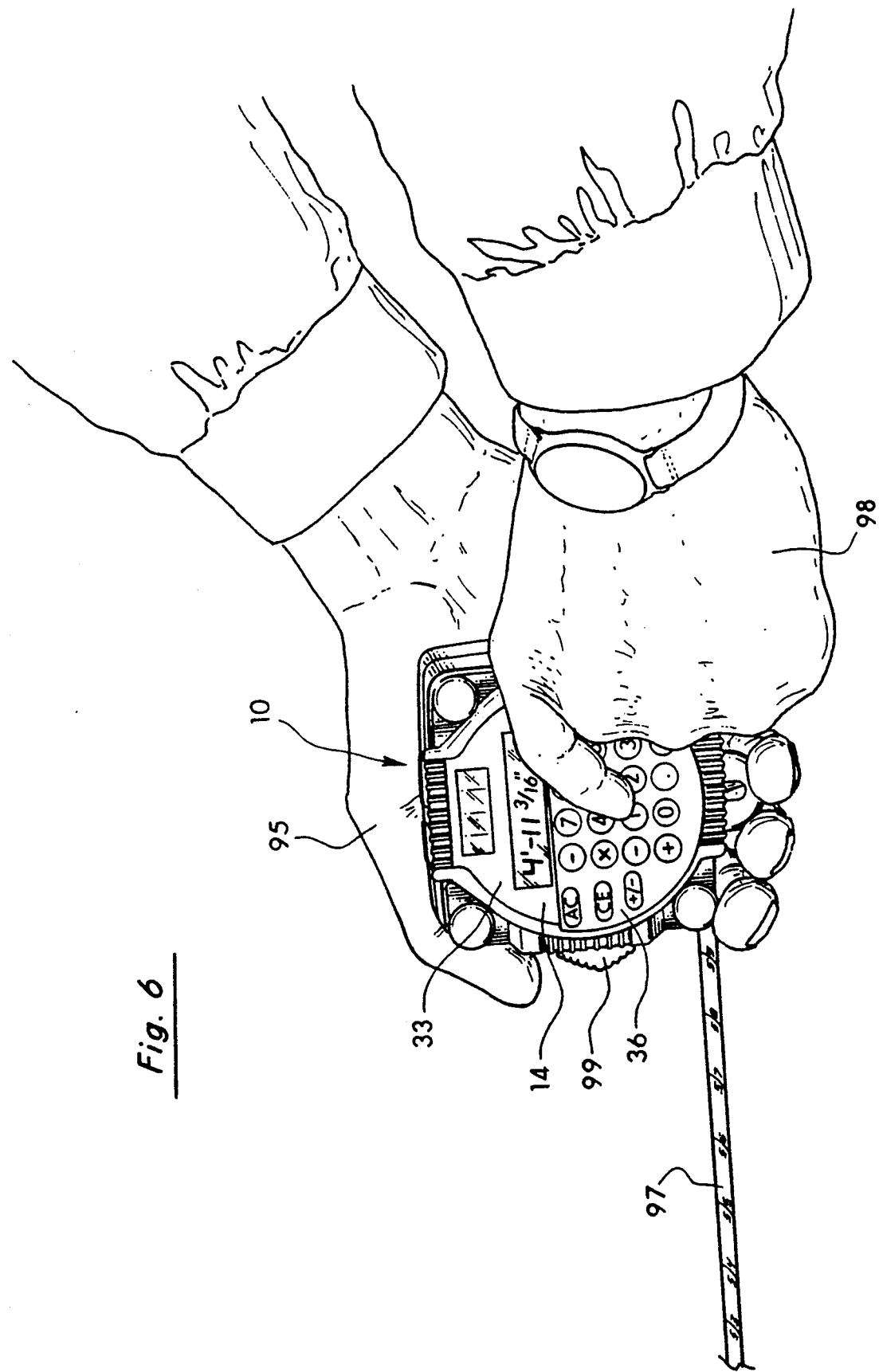
FIG. 6 illustrates a preferred embodiment of the method according to the invention.

As can be best seen in FIGS. 1, 5 and 6, the external shape and dimensions of the case 16 conform to the shape and dimensions of conventional tape rule cases, which makes the tape rule/calculator a single, compact, easy to handle unit, and also results in the tape rule providing protection to the calculator. Extension 51 provides a lever that is useful for removing the calculator 14 from case 16. Slot 52 enables a cord (not shown) to be attached to the calculator and the calculator 14 to be hung about the neck. The extension 51 is arranged so that keypad 36 and display 38 are easily viewable when the calculator 14 is hung around the neck.

The calculator housing 37 is preferably made of high strength plastic, such as ABS or polycarbonate. Case 16 is preferably made of a more flexible plastic, such as polyethylene, which allows the case to flex slightly so that the calculator can more easily be snapped in and out, and which also provides shock absorbing capability. Preferably the calculator is a foot-inches-fractions calculator as described in U.S. Pat. No. 4,488,250 which is hereby incorporated by reference. Preferably the calculator automatically calculates areas and volumes. Keypad 36 is a conventional keypad such as may be ordered according to desired specifications from any number of electronic parts suppliers with the indicia preferably as shown in FIG. 2E. Display 38 is preferably a LCD display and the power source 40 is a conventional solar cell both of which can be ordered according to desired specifications from any number of electronic parts suppliers. The electronics module (not shown) is preferably a conventional 4 bit, CMOS, low power, single-chip CPU with a built in LCD driver, which CPUs are available from many different manufacturers. In the preferred embodiment, the chip is programmed to have a plurality of registers in its memory, preferably 10 registers, which registers may be used to store lists of measurement information and/or to hold numbers repeatably used in calculations. Lens 42 is preferably made of Lexan TM, but any other appropriate hard, clear material may be used. Resilient band 18 is preferably made of an ethylene propylene diene monomer (EPDM), such as Neoprene TM, or any other resilient material which is resistant to ultraviolet light, pollutants, and abrasion. The tape rule 12 may be any conventional tape rule, such as the Stanley Powerlock TM 25 foot tape rule.

The method of the invention is illustrated in FIG. 6. According to the invention, the tape rule/calculator 10 is grasped in one hand 95, the end 96 (FIG. 1) of the tape 97 is hooked or otherwise placed at the beginning of the distance to be measured, the tape 97 is unrolled by moving the tape rule/calculator 10, and when the end of the distance to be measured is reached, the measurement is noted and entered into calculator 14 with the other hand 98. Since the tape 97 is flexible, the tape rule/ calculator unit 10 may be tilted to more easily view the calculator face 33 and to reach the keypad 36 with the fingers of hand 98. Of course, one may hold the tape rule/calculator unit 10 with both hands while moving it, or switch hands at any time during the method with the same result.

The method of the invention greatly increases the rapidity with which a measurement may be made and recorded. It eliminates the time it takes to set the tape lock button 99, pick up a pencil and paper or some other recording instrument such as a calculator, record the measurement, then release the lock button 99 to take another measurement. Moreover, often, especially when many measurements are being made sequentially, the measurement may be forgotten or confused with a previous measurement between the time it is taken and the time the pencil or paper or other recording instrument is picked up. Thus the accuracy of recording and calculating is also increased. Often one can view both the measurement and the calculator in the same line of vision, so errors are reduced.

It is a feature of the invention that the calculator 14 may be used simply to record a series of measurements rather than to calculate, or do both. For example, carpenters often write down a cut list while making a series of measurements of cuts to be taken. This list is often recorded with a pencil on a piece of wood. The system 10 of the invention may instead be used to both to make the measurements and record the cut list. This eliminates the need to release the tape rule and pick up the pencil and piece of wood.

It is another feature of the invention that the tape rule 12, case 16, and calculator 14 form a single unit that can easily be handled. The design of the system 10 makes the attachment very secure without wobble, particularly when the calculator is mounted on sides 24 and 28 of tape rule 12.

It is a further feature of the invention that the calculator can be mounted on any of five sides of the tape rule 12, and calculator 14 may be rotated in two orientations with respect to case 16 with the face 33 outward. This permits the calculator to be placed in whatever position that is best for the measurements being taken. For example, if many consecutive measurements were to be taken on a vertical surface, it may be desirable to mount the calculator on side 26. It is a related feature that the calculator may also be rotated and snapped into case 16 so that face 33 is in toward tape rule 12, and the back 45 of the calculator housing 37 protects the display 38, power source 40 and keypad 36. Two different orientations of calculator 14 with respect to case 16 are possible in this protective mode.

It is a feature of the invention that once experience is gained with the tape rule/calculator system 10, it becomes a new tool with different uses than the separate calculators and tape rules of the prior art. Many more measurements may be taken sequentially, and more efficient patterns of measurement replace the conventional patterns of measurement.

There has been described novel tape rule/calculator system that makes a calculator readily available when using a tape rule and has many other advantages. It should be understood that the particular embodiment shown in the drawings and described within this specification is for purposes of example and should not be construed to limit the invention which will be described in the claims below. Further, it is evident that those skilled in the art may now make numerous uses and modifications of the specific embodiment described, without departing from the inventive concepts. For example, now that the advantage of combining a tape rule and calculator is seen, many other ways of attaching the calculator to the tape rule may be devised. The case 16 may be changed completely or eliminated entirely with the calculator 14 being attached directly to the tape rule 12. Other equivalent parts may be substituted. Other features may be added, or one or the other of the optional features may be deleted. As the new tool becomes commonplace, equivalent methods of using in may be devised. Consequently, the invention is to be construed as embracing each and every novel feature and novel combination of features present in and/or possessed by the tape rule/calculator system and method described.

What is claimed is:

1. A tape rule/calculator system comprising:
   a tape rule having a tape rule housing;
   a calculator having a calculator housing that is separate and distinct from said tape rule housing; and
   attaching means for attaching said calculator housing to said tape rule housing while permitting said calculator housing to be readily removed from said tape rule housing and be reattached in any one of a plurality of possible orientations.

2. A system as in claim 1 wherein said attaching means comprises:
   a calculator case;
   calculator attaching means for attaching said calculator housing to said calculator case; and
   case attaching means for attaching said case to said tape rule housing.

3. A system as in claim 2 wherein said calculator attaching means comprises snap tabs.

4. A system as in claim 2 wherein said case attaching means comprises a resilient band.

5. A system as in claim 4 wherein said case includes a case base member for contacting said tape rule housing, and said base member has a recessed channel for receiving said resilient band.

6. A system as in claim 4 wherein said resilient band includes a cut out portion.

7. A system as in claim 4 wherein said resilient band is made of EPDM.

8. A system as in claim 2 wherein said calculator attaching means comprises means for attaching said calculator to said case in any one of a plurality of possible orientations.

9. A system as in claim 8 wherein said calculator includes a display any keyboard attached to one side of said calculator housing, and said calculator attaching means comprises means for attaching said calculator to said tape rule housing either with said display and keyboard toward said tape rule housing so that said display and keyboard are protected or with said display and keyboard away from said tape rule housing thereby exposing said display and keyboard for use.

10. A system as in claim 2 wherein said case attaching means comprises means for attaching said case to said tape rule in any one of a plurality of possible orientations.

11. A system as in claim 10 wherein:
    said tape rule housing has at least two sides; and said case attaching means comprises means for attaching said case aligned along any one of a plurality of said sides.

12. A tape rule/calculator system comprising:
a tape rule having a tape rule housing;
a calculator having a calculator housing that is separate and distinct from said tape rule housing;
a calculator case;
calculator attaching means for attaching said calculator housing to said calculator case; and
case attaching means for attaching said case to said tape rule housing in any one of a plurality of possible orientations.

13. A tape rule/calculator system as in claim 12 wherein said tape rule housing has a threaded bore, said case includes a case base member for contacting said tape rule housing, said base member having an opening therein, and said case attaching means comprises a screw passing through said base member opening and screwing into said threaded bore in said tape rule housing.

14. A system as in claim 12 wherein said case attaching means comprises means for releasably attaching said case to said tape rule housing.

15. A tape rule/calculator system comprising:
a tape rule having a tape rule housing;
a calculator having a calculator housing that is separate and distinct from said tape rule housing;
a calculator case;
calculator attaching means for attaching said calculator housing to said calculator case in any one of a plurality of possible orientations; and
case attaching means for attaching said case to said tape rule housing.

16. A system as in claim 15 wherein said calculator attaching means comprises means for releasably attaching said calculator to said case.

17. A tape rule/calculator system comprising:
a tape rule having a tape rule housing;
a calculator having a calculator housing; and
attaching means for attaching said calculator housing to said tape rule housing and wherein:
said tape rule housing has at least two sides; and
said attaching means comprises means for attaching said calculator aligned along any one of a plurality of said sides.

18. A tape rule/calculator system comprising:
a tape rule having a tape rule housing;
a calculator having a calculator housing that is separate and distinct from said tape rule housing; and
snap tab attaching means for releasably attaching said calculator housing to said tape rule housing in any one of a plurality of possible orientations.

* * * * *